Oct. 10, 1950      H. D. FLORA      2,525,481
REVERSING TRANSMISSION FOR CORN PICKER ROLLS
Filed Feb. 5, 1947      2 Sheets-Sheet 2
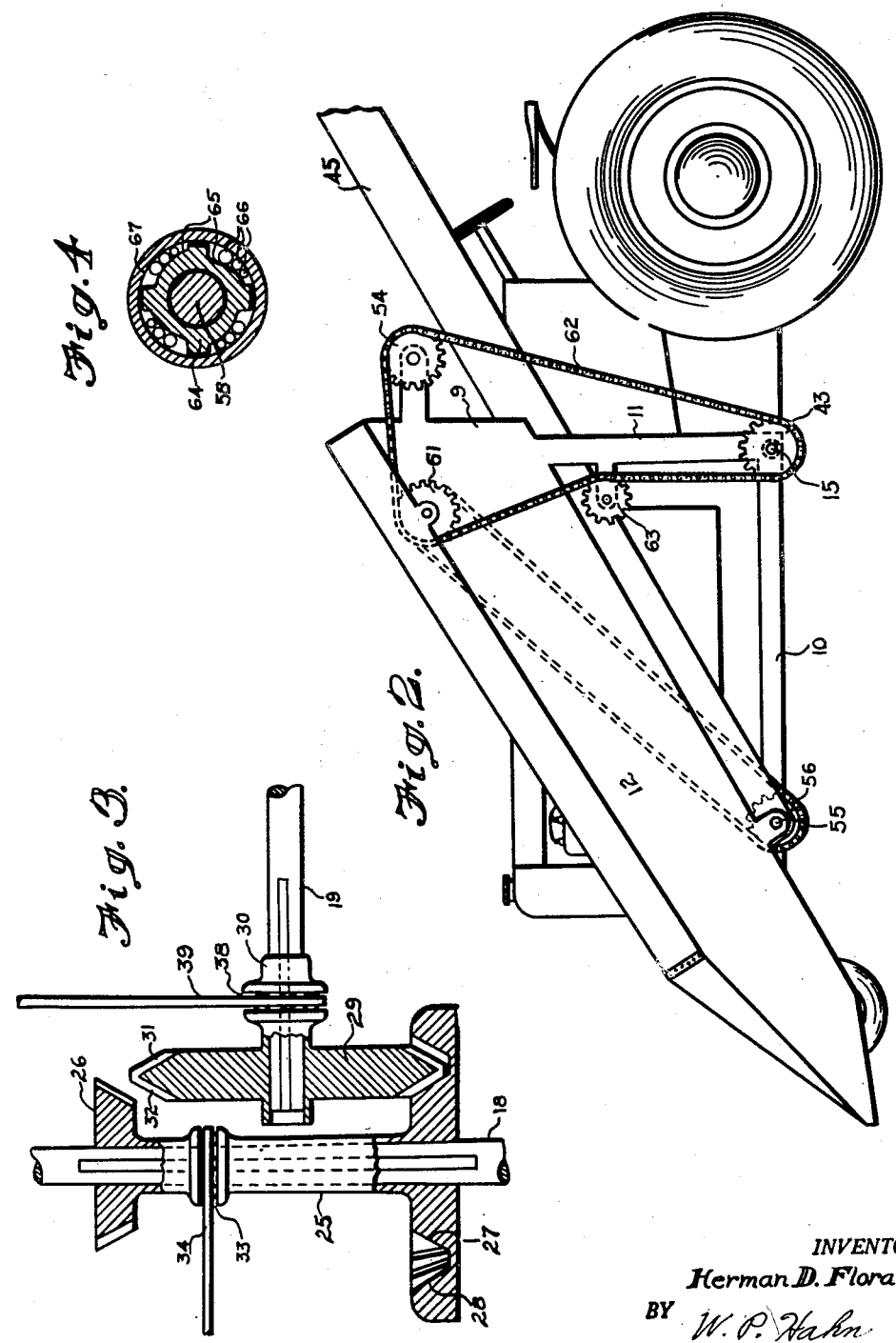
INVENTOR.
Herman D. Flora
BY W. P. Hahn
ATTORNEY Patented Oct. 10, 1950

2,525,481

UNITED STATES PATENT OFFICE 2,525,481

REVERSING TRANSMISSION FOR CORN PICKER ROLLS

Herman D. Flora, Cutler, Ind.

Application February 5, 1947, Serial No. 726,558

7 Claims. (Cl. 56—18)

The present invention relates to improvements in corn harvesters or pickers.

Primarily, the invention relates to improvements in the drive of the snapper rolls and the elevator of a tractor operated corn harvester.

Heretofore, in the commercial art, there has been no provision for reversing the operation of the snapper rolls and from an operative standpoint, this has proved to have decided disadvantages. For instance, there have been times when an operator's hand or limb has been caught between the snapper rolls during the operation of the apparatus and, while the drive of the rolls may be stopped, it is extremely difficult to extract the caught limb without considerable damage to the person.

Furthermore, during the operation of the corn harvesting machine, considerable trash, in the form of stalks, leaves, etc., will accumulate between or on the snapper rolls and it is extremely difficult to remove this trash. Frequently, the corn stalks or leaves become wrapped around the snapper rolls and the only way they can be moved is by using some implement for cutting the stalks and tearing the stalks out.

It is one of the objects of my invention to provide a means whereby the drive of the snapper rolls may be reversed to enable the snapper rolls to be run in a reverse or in a discharge direction.

It is a further object of my invention to provide a drive for the snapper rolls and a drive for the elevator mechanism of the harvester, so arranged that the front ends of the snapper rolls may be adjusted vertically to accommodate various conditions of the terrain, without in any way affecting the driving mechanism.

It is a further object of my invention to provide a corn harvester, and particularly a drive therefor, which shall be extremely simple in construction, light in weight, and easily mounted or dismounted on a tractor.

It is a further object of my invention to provide a drive for a harvester mechanism which may be readily mounted under the tractor crank case and transmission and differential cases and extended forward of the rear wheels, thus enabling the placing of the drive mechanism in such a position that there is no danger of the legs or feet of the operator coming in contact with the same.

It is a still further object of my invention to provide a corn harvester, and particularly a corn harvester drive by which trash, stalks and such foreign subject matter which tend to prevent the free rotation of the snapper rolls may be removed from the snapper rolls, without the operator descending from his seat on the tractor, thereby saving considerable time and effort on the part of the driver, and enabling the driver to be clear of the moving parts of the harvester while removing such trash, etc.

It is a further object of my invention to provide a drive for the snapper rolls and conveyor of a corn harvester, which will provide a plurality of forward speeds as well as reverse speed, thus enabling the operator to adjust the speed of the snapper rolls to various conditions of the corn to be harvested, and without affecting the ground speed of the tractor.

A further object of my invention is to provide a means whereby, while the reverse drive of the snapper rolls may be effected, the reversal of this drive will not reverse the drive of the conveyor.

Other objects and advantages of my invention will appear more fully in the accompanying drawings disclosing an embodiment of my invention, and in which:

Fig. 2 is a side elevation thereof;

Fig. 3 is a detail section of the change speed drive for the harvester mechanism; and Fig. 4 is a detail sectional view showing an overrunning clutch drive for the elevator of the harvester.

Figure 1:
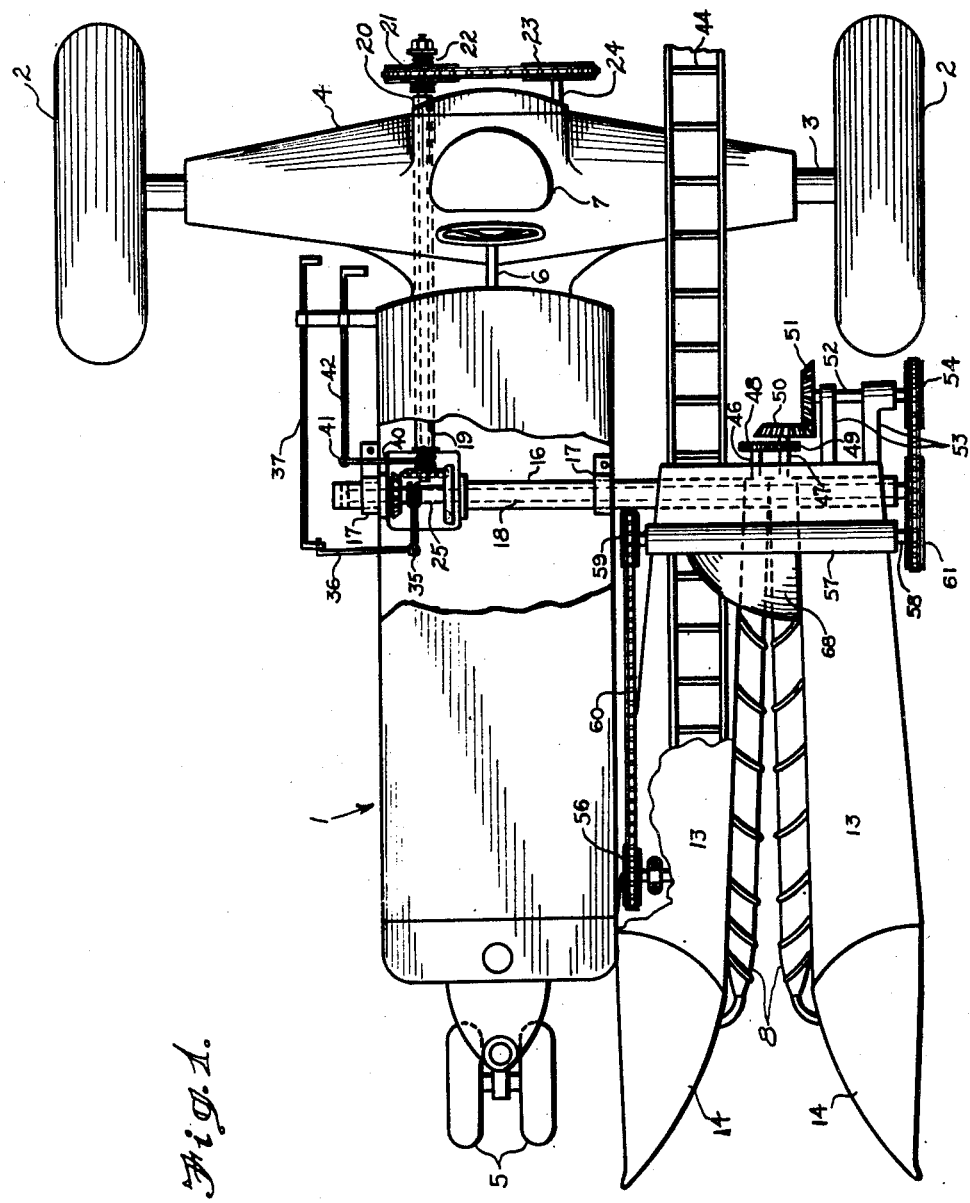
Fig. 1 is a plan view of a tractor driven corn harvester embodying my invention.

In the embodiment of the invention illustrated, the usual commercial type tractor 1 is provided, which tractor of the type illustrated in the drawings, includes the usual operating hydro-carbon engine for driving the same, being provided with the usual drive for tractors of this character, which drive operates the rear wheels or propelling wheels 2—2 mounted on the rear axle 3 in turn supported in the rear axle and differential housing 4. The front end of the tractor is provided with the usual pair of closely adjacent steering wheels 5 which may be manipulated from a steering post 6 located in front of the driver seat 7, which seat is secured to and supported upon the housing 4. A further detail description of the tractor 1 is deemed unnecessary, as such tractors are of well-known commercial structure and the particular type of tractor forms no part of my present invention.

The harvesting mechanism consists of a pair of snapper rolls 8, which are of the conventional design for this type of harvester. These rolls are mounted within a supporting frame, which frame includes the side members 9. The side members comprise the bottom or longitudinal frame members 10, together with the vertical frame members 11 which are connected together by a suitable inclined side frame member 12. The frame members are duplicates, one being disposed on each side of the snapper roll assembly, and provide a suitable support for the harvester assembly. The diagonally disposed side members 12 also support covering shields 13, which partially enclose and cover the snapper rolls and which are formed with divergent ends 14 for guiding the corn stalks into the snapper rolls. The frame as a whole, is pivotally supported to swing about a pivotal support point 15, so that the front end of the harvester may be vertically moved to accommodate different characters of terrain. The swinging of the frame on its pivotal point may be accomplished by a suitable hand-operated mechanism (not shown). The detail construction of the supporting frame and structural members making up the picker unit are immaterial and form a part of the present invention only as such structure is necessary to provide a structural relationship of the functionally cooperating elements.

The supporting frame is pivotally supported upon a hollow sleeve 16, the axis of which coincides with the axis 15 of the frame and this sleeve is secured to the underside of the frame of the tractor 1 in any suitable manner, as by supporting collars 17 rigidly fastened to the underside of the tractor frame.

Extending through this sleeve 16 is the drive shaft 18 for the elevator mechanism and for the snapper rolls. This drive shaft is driven from the tractor and to this end, I provide, at right angles to the drive shaft 18, a drive shaft 19 operating within a suitable sleeve 20 mounted on the underside of the tractor. The rear end of this drive shaft is provided with a sprocket wheel 21 drivingly connected to the drive shaft through the medium of a slip clutch 22. The sprocket wheel 21 is driven by a chain drive from a sprocket wheel 23 mounted on a power take-off shaft 24 of the tractor. The details of the drive of the power take-off shaft 24 are not shown, as this is of standard construction and is practically present on all commercial types of tractors.

For driving the shaft 18 from a shaft 19, I provide a gear mechanism which will provide two speeds forward and one reverse. To this end, a spindle or a hub 25 is splined on the shaft 18. This hub 25 carries at one end, a relatively small bevel gear 26 and at the opposite end, a relatively larger external bevel gear 27 and on the same disk an internal bevel gear 28. Adapted to cooperate with the above-mentioned bevel gears is a bevel gear member 29, the hub 30 of which is splined on the shaft 19. This gear member 29 is provided with a pair of toothed gear faces 31 and 32. The drive through this gearing transmission may be effected by shifting the hub 30 in a direction to engage the bevel face 32 of the gear 29 with the bevel gear 28. Under these conditions, the shaft 18 will be driven forwardly, that is in a direction to operate the snapper rolls for removing the corn ears from the stalks. However, due to the fact that the gear 27 is a relatively low speed gear, the drive will be relatively slow. If the operator desires to increase the speed of the drive of the snapper rolls, the hub 30 is shifted in the opposite direction to mesh the gear teeth on the face 31 with the internal bevel gear 28. Under these circumstances, the snapper rolls will be driven forwardly at an increased speed.

If it be desired to reverse the drive of the snapper rolls, it is merely necessary to shift the hub 25 until the bevel-toothed face 32 meshes with the bevel gear 26, and under these circumstances, the drive of the shaft 18 will be in the opposite direction.

For effecting the shifting of the gear drive, the hub 25 is provided with an annular groove 33, within which operates a fork 34, embracing the hub and pivoted at the underside of the tractor as at 35. The opposite bell crank arm 36 of the fork 34 is suitably connected with a shift rod 37 extending rearwardly and adjacent to the seat 7 so that either by foot manipulation or hand manipulation, the rod 37 may be rotated and in doing so, the hub 25 shifted in the direction desired.

The hub 30 is provided with a suitable annular groove 38, within which operates a fork 39 which embraces the hub and this fork is pivoted, as at 40, to the underside of the tractor frame. The opposite end of the fork is pivotally connected, as at 41, to a shift rod 42, which extends rearwardly to a point adjacent the drive seat 7, so that through the reciprocation of the shift rod 42, the gear member 29 may be shifted on the shaft 19 to engage its bevel gears in the manner heretofore described.

The shaft 18 extends beyond the sleeve 16 carrying on its end, the sprocket 43, which constitutes the main sprocket drive for the snapper rolls 8 and for the conveyor 44, which conveyor is supported in a suitable framework 45 supported from the main supporting frame. To the end that the snapper rolls 8 may be driven, the shafts 46 and 47 of these rolls are provided with meshing gear wheels 48 and 49, whereby one shaft may be driven from the other. The shaft 47 is provided with a bevel gear 50 meshing with the bevel gear 51 mounted on a shaft 52 journalled in rearwardly extending supporting arms 53 on the frame. This shaft 52 carries at its opposite end a sprocket wheel 54.

The driving shaft 55 is located at the lower end of the conveyor and is provided with a driving sprocket 56. It is to be noted that the drive for the conveyor 44 is mounted on the opposite side of the snapper rolls from that of the main drive sprocket 43 and in order to provide for a drive of this sprocket wheel 56, I extend across the top of the frame through a suitable sleeve 57, a shaft 58 carrying a driving sprocket 59 connected with the conveyor drive sprocket 56 by a sprocket chain 60. The opposite end of this shaft 58 carries a sprocket 61 and the sprockets 61 and 54 are driven from the main drive sprocket 43 through the medium of a sprocket chain 62, which passes beneath a guiding idler sprocket 63 over the sprocket 61 over the sprocket 54 and over the driving sprocket 43.

In order that the reverse drive, when a reverse drive is effected through the medium of the reverse drive gearing, will not reverse the drive of the conveyor 44, the driving sprocket 61 is drivingly connected to the driving shaft 58 through the medium of a one-way clutch, more particularly illustrated in Fig. 4. This one-way driving clutch comprises a hub 64 keyed on the shaft 58 and having a plurality of cam surfaces 65 with which are adapted to cooperate suitable clutch rollers 66, which rollers, when they ride up the cam surfaces 65 are forced into engagement with the inner surface 67 of the hub of the sprocket 59. By this arrangement, when the shaft 58 is driven from the main drive sprocket 43, with the snapper rolls 8 being driven in a harvesting direction, the rolls 66 will ride up the cam surfaces 65 frictionally locking the sprocket 59 to the shaft 58, so that a drive may be effected. However, in event the rotation of the drive is reversed and event the rotation of the drive sprocket 61 is reversed, the rolls riding down the cam surfaces will permit the sprocket 61 to rotate freely and the drive of the conveyor 44 will be released.

In order that the harvested corn ears may be transferred from the snapper rolls to the conveyor 44, the upper part of the shield 13 adjacent the conveyor 44 is cut away and the snapper rolls at the top are covered by a suitable shield 68, which will deflect the harvested corn on to the conveyor 44 by which it may be transferred to a trailing wagon or cause to drop on the ground, as desired.

By providing a slip clutch 22 between the sprocket 21 and the shaft 19, damage to the driving mechanism or the conveyor and damage to the snapper rolls is prevented in event these rolls become jammed for any reason. In event of the jamming of the snapper rolls 8, so that they will not be rotated under normal conditions, the clutch 22 will slip, thus avoiding undue strain on the driving parts.

I claim as my invention:

1. A drive for the snapper rolls of a corn harvester, which harvester comprises a motor driven tractor having a power take off drive driven in one direction only from the propelling driving shaft of the tractor, a frame having at least a portion thereof supported on said tractor and snapper rolls rotatably mounted on said frame, said snapper roll drive comprising a driving means including forward and reverse drive gears drivingly connecting said snapper rolls with the power take off for driving the rolls in opposite directions and for reversing the direction of rotation of the rolls.

2. The subject-matter of claim 1 wherein said snapper roll drive includes change speed driving means.

3. A drive for the snapper rolls and the conveyor of a corn harvester, which harvester comprises a motor driven tractor having a power take off drive driven in one direction only from the propelling driving shaft of the tractor, a frame having at least a portion thereof supported on said tractor, snapper rolls rotatably mounted on said frame, a conveyor supported on said frame adjacent said snapper rolls, said drive comprising driving means for drivingly connecting said snapper rolls and said conveyor with the power take off including a driving shaft drivingly connected to said snapper rolls, a gear mechanism having forward and reverse gears drivingly connecting said driving shaft with said power take off drive for driving the rolls in opposite directions and for reversing the direction of rotation of the rolls and a one-way clutch drivingly connecting said shaft with said conveyor.

4. A drive for the snapper rolls of a corn harvester, which harvester comprises a motor driven tractor having a power take off drive driven in one direction only from the propelling driving shaft of the tractor, a frame pivotally supported on one side of a tractor to swing on a horizontal axis and snapper rolls rotatably mounted on said frame, said drive comprising a driving shaft drivingly connected with the snapper rolls and extending transversely of the tractor body and rotating on an axis coincident with the swinging axis of the frame, and a gearing including shiftable forward and reverse drive gears drivingly connecting said shaft with the power take off drive for driving the rolls in opposite directions and for reversing the direction of rotation of the rolls.

5. A drive for the snapper rolls and conveyor of a corn harvester, which harvestor comprises a motor driven tractor having a power take off drive driven in one direction only from the propelling drive shaft of the tractor, a frame pivotally supported on said tractor to oscillate on a horizontal axis, a pair of rotatable snapper rolls supported by said frame and a conveyor supported by said frame adjacent said snapper rolls, said drive comprising a shaft drivingly connected with the snapper rolls and extending transversely of the tractor body and rotating on an axis coincident with the oscillating axis of the frame, a gearing having shiftable forward and reverse gears interposed between said transversely extending shaft and power take off and a one-way clutch drivingly connecting said shaft with said conveyor.

6. A drive for the snapper rolls and conveyor of a corn harvester, which harvester comprises a motor driven tractor having a power take off drive driven in one direction only from the propelling driving shaft of the tractor, a supporting frame pivotally supported at the rear and at one side of said tractor to swing on a horizontal axis, snapper rolls supported on said frame and inclined forwardly and downwardly thereon, a conveyor supported on said frame at one side of said rolls and extending rearwardly of said frame, said snapper roll and conveyor drive comprising a first driving shaft drivingly connected with the snapper rolls and extending beneath the tractor and said frame and extending transversely thereof and rotating on an axis coincident with the pivotal axis of said frame, a driving sprocket at one end of said shaft, a second driving shaft drivingly connected with said conveyor, a one way clutch drivingly connecting said conveyor with said second driving shaft, a driving chain connecting the driving sprocket of said first driving shaft with the conveyor driving shaft and a gearing drivingly connecting said first mentioned driving shaft with the power take off of the tractor and including shiftable forward and reverse gear drives for driving the rolls in opposite directions and for reversing the direction of rotation of the rolls.

7. A drive for the snapper rolls of a corn harvester, which harvester comprises a motor driven tractor having a power take off drive driven in one direction only from the propelling driving shaft of the tractor, a frame having at least a portion thereof supported on said tractor, a pair of snapper rolls rotatably supported in said frame, said snapper roll drive comprising a first driving shaft extending transversely of the tractor, means for drivingly connecting said first shaft with said snapper rolls for driving the snapper rolls in opposite directions, a second driving shaft extending longitudinally of the tractor and driven from the power take off drive of the tractor and gearing drivingly connecting said first and second driving shafts including shiftable forward and reverse drive gears for drivng the snapper rolls in opposite directions and for reversing the direction of rotation of the rolls.

HERMAN D. FLORA.

REFERENCES CITED

The following references are of record in the file of this patent:

UNITED STATES PATENTS

| Number | Name | Date |
|---|---|---|
| 676,440 | Mills | Jan. 18, 1901 |
| 1,256,347 | Meharry | Feb. 12, 1918 |
| 2,152,273 | Otto | Mar. 28, 1939 |
| 2,412,331 | Green | Dec. 10, 1946 |